United States Patent
Ryan et al.

(10) Patent No.: US 11,900,158 B2
(45) Date of Patent: Feb. 13, 2024

(54) SETTING TASK PERMISSIONS FOR SOFTWARE SERVICES IN DISTRIBUTED COMPUTING ENVIRONMENTS

(71) Applicant: Red Hat, Inc., Raleigh, NC (US)

(72) Inventors: Michael Gerard Ryan, Waterford City (IE); Brian Gallagher, Waterford City (IE)

(73) Assignee: Red Hat, Inc., Raleigh, NC (US)

( * ) Notice: Subject to any disclaimer, the term of this patent is extended or adjusted under 35 U.S.C. 154(b) by 340 days.

(21) Appl. No.: 17/167,806

(22) Filed: Feb. 4, 2021

(65) Prior Publication Data

US 2022/0244989 A1    Aug. 4, 2022

(51) Int. Cl.
| | |
|---|---|
| *G06F 9/46* | (2006.01) |
| *G06F 9/48* | (2006.01) |
| *G06F 9/50* | (2006.01) |
| *G06F 8/70* | (2018.01) |
| *G06F 21/31* | (2013.01) |

(52) U.S. Cl.
CPC .............. *G06F 9/4881* (2013.01); *G06F 8/70* (2013.01); *G06F 9/5038* (2013.01); *G06F 21/31* (2013.01); *G06F 2209/482* (2013.01)

(58) Field of Classification Search
CPC ........ G06F 9/4881; G06F 9/5038; G06F 8/70; G06F 21/31; G06F 2209/482
See application file for complete search history.

(56) References Cited

U.S. PATENT DOCUMENTS

| | | | |
|---|---|---|---|
| 9,985,905 B2 | 5/2018 | Kampas et al. |
| 10,027,768 B2 | 7/2018 | Rao |
| 10,248,657 B2 | 4/2019 | Prahlad et al. |
| 10,296,952 B2 | 5/2019 | Gupte et al. |

(Continued)

FOREIGN PATENT DOCUMENTS

| | | | | |
|---|---|---|---|---|
| CN | 101390105 B | * | 8/2011 | .............. G06F 21/10 |
| CN | 106991297 A | * | 7/2017 | ........... G06F 21/105 |
| JP | 2008146408 A1 | * | 8/2010 | .............. G06F 21/10 |

OTHER PUBLICATIONS

Dowell, S., et al., "Cloud to Cloud Interoperability," Proc. of the 2011 6th International Conference on System of Systems Engineering, 2011, https://ieeexplore.ieee.org/abstract/document/5966607?casa_token=B-iPD5VnifgAAAAA:XTbgdaUe7m6fpmuEMrqjQ2 0qCTV9VMYJ9v6HDxbFpkKqbEFpo8lplOt3XylarT_uONi8Ob35dS0.

*Primary Examiner* — Diem K Cao
(74) *Attorney, Agent, or Firm* — Kilpatrick Townsend & Stockton LLP

(57) ABSTRACT

Task permissions for software services can be set in a distributed computing environment according to some examples described herein. In one example, a system can determine software services that are included in software products deployable to a user account of a distributed computing environment. The system can determine task permissions to be set in the user account for allowing the software services to execute tasks in the distributed computing environment. The system can generate a list of task permissions by consolidating the task permissions based on predefined rules. The system can then transmit an output indicating the list of task permissions for causing the user account to be configured based on the list of task permissions, to permit the software services to execute the tasks in the distributed computing environment.

20 Claims, 4 Drawing Sheets

(56) References Cited

U.S. PATENT DOCUMENTS

| | | |
|---|---|---|
| 10,462,018 B2 | 10/2019 | Gupte et al. |
| 10,666,515 B2 | 5/2020 | Imperia et al. |
| 11,443,067 B2* | 9/2022 | Bartolotta ................. G06F 8/71 |
| 2006/0156384 A1* | 7/2006 | Minium .............. G06F 21/6218 |
| | | 726/2 |
| 2016/0134616 A1* | 5/2016 | Koushik ............... G06F 21/335 |
| | | 726/9 |
| 2020/0252451 A1 | 8/2020 | Nandavar et al. |

\* cited by examiner

SETTING TASK PERMISSIONS FOR SOFTWARE SERVICES IN DISTRIBUTED COMPUTING ENVIRONMENTS

TECHNICAL FIELD

The present disclosure relates generally to configuring software services. More specifically, but not by way of limitation, this disclosure relates to setting task permissions for software services in distributed computing environments, such as cloud computing environments.

BACKGROUND

Distributed computing environments such as cloud computing environments have recently grown in popularity given their ability to reduce costs, improve scalability, and reduce time to deploy new software. In a typical arrangement, a service provider operates the physical infrastructure underlying the distributed computing environment and users (e.g., customers) purchase access to the computing resources of the distributed computing environment using any number of payment models.

To access the distributed computing environment, a user will generally sign up for a user account with the service provider and login to the user account using login credentials, such as a user name and password. Once logged in, the user can deploy software to the user's account. Deploying software to a user account can involve deploying the software to the computing resources that are allocated to the user's account in the distributed computing environment.

One type of software that can be deployed to a distributed computing environment is a software product. A software product includes multiple distinct software-services, such as microservices and serverless functions, that interact with one another to effectuate the overall functionality of the software product. Such software services can be deployed, configured, updated, and executed independently of one another in the distributed computing environment, which can yield improvements to scalability and robustness over conventional monolithic applications. The software services generally interact with one another via well-defined interfaces such as application programming interfaces (APIs). Some software products may include dozens or hundreds of software services, which can make these software products highly complex.

Given the complexities associated with deploying and maintaining software products, many users have turned to vendors that offer managed software products to offload some of these responsibilities. Managed software products are software products that are managed on a user's account by a vendor, such as the service provider itself or a third party. These vendors may deploy, configure, and maintain (e.g., monitor and update) software products on the user's account so that the user can focus on other tasks. The user provides the vendor with the login credentials for the user account so that the vendor can login to the account and perform these jobs on behalf of the user. For security and other reasons, a user may have separate user accounts for each individual vendor, so that multiple vendors do not have access to the same account and each other's managed software products.

DETAILED DESCRIPTION

Figure 1:
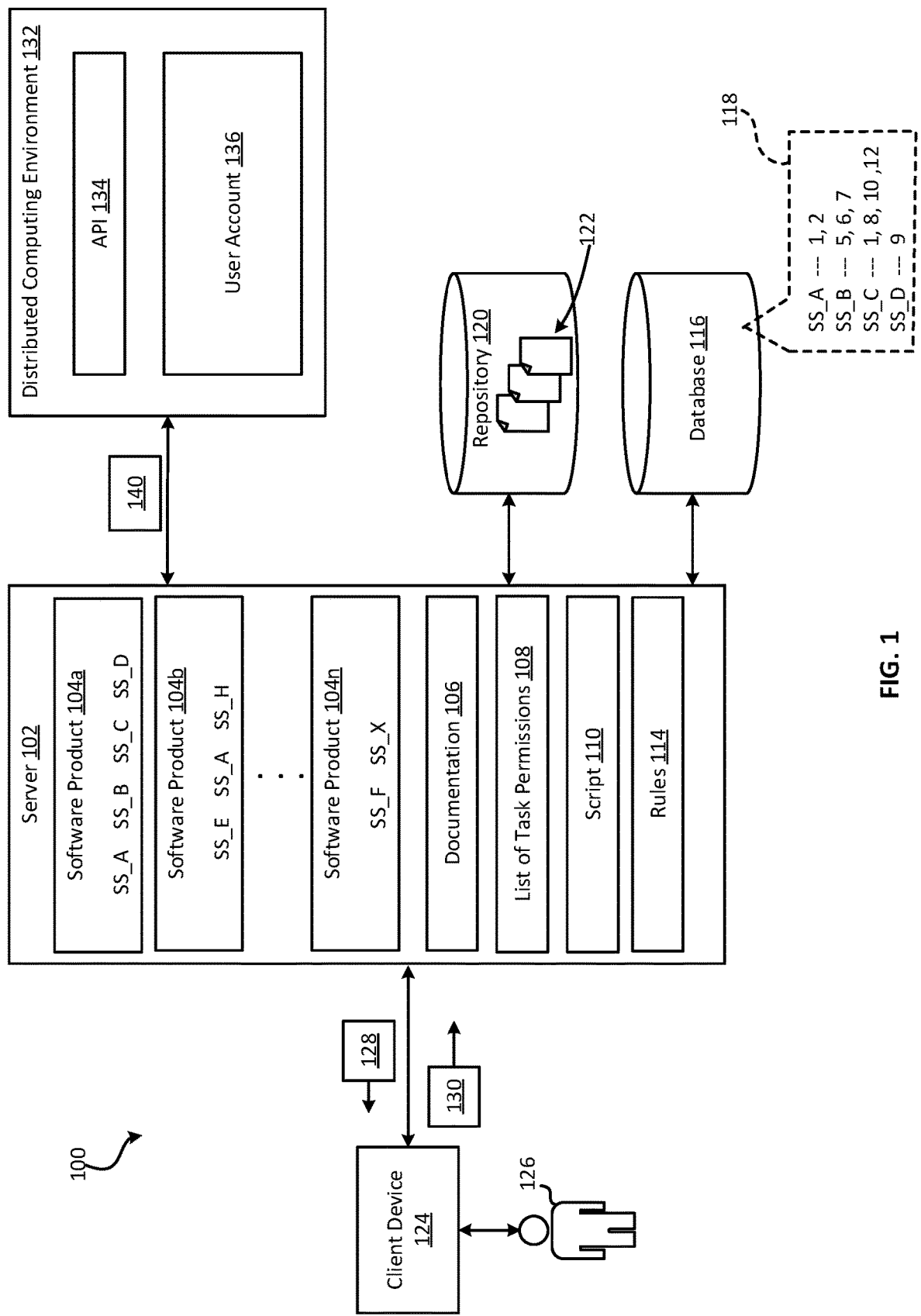
FIG. 1 is a block diagram of an example of a system for setting task permissions for software services in a distributed computing environment according to some aspects of the present disclosure.

Users may wish to deploy software products to distributed computing environments, such as cloud computing environment, computing clusters, and data grids. Such software products can include multiple distinct software-services that may require certain task permissions to properly operate. A task permission is permission for a software service to execute a particular task in a distributed computing environment. But it can be challenging to determine which task permissions to set for each software service. For example, the user may need to manually review dozens or hundreds of pages of documentation accompanying each software product to determine how to set the task permissions, which can be a slow, tedious, and error-prone process. This process can be further complicated in situations where the user wishes to deploy multiple software products that require different task permissions for the same software service.

The difficulties surrounding identifying the correct task permissions may lead to under-permissioned or over-permissioned software services. Under-permissioning can occur if the user does not provide sufficient task permissions for a software service, which may cause the software service to fail or otherwise be unable to execute its corresponding tasks, negatively impacting the operation of the software product. Since this negative impact can manifest in a variety of ways, it may not be readily apparent that improperly set task permissions are the root cause, making such issues challenging to troubleshoot. This may be particularly true in the case of managed software products, where the vendor deploying the software product is different from the user managing the task permissions of the account. Over-permissioning can occur if the user provides superfluous privileges to a software service, which can raise significant security issues. For example, over-permissioning may allow a software service to access sensitive data or execute superfluous functionality that may be exploited by a malicious attacker.

Some examples of the present disclosure can overcome one or more of the abovementioned problems via a system that can determine a group of software services to be deployed to a user account of a distributed computing environment and automatically generate a list of task permissions to set for the group of software services. In circumstances where multiple software products require different task permissions for the same software service, the system can aggregate and consolidate the different task permissions based on predefined rules, to avoid including conflicting task permissions or duplicate task permissions in the list of task permissions. Once the list of task permissions has been generated, the task permissions for the software services can be properly set in the user account. By automatically generating the list of task permissions in this way, under-permissioning or over-permissioning of the software services can be avoided, which can reduce operating errors and avoid security issues associated with the software services. This may also reduce the burden on the user in determining the appropriate permission settings for the software services.

In some examples, the system can confirm that the task permissions for each software service have been properly set in the user account, before or after the software service is deployed to the user account. If a task permission for a software service has not been properly set in the user account, the system can warn the user about the issue and may prevent the corresponding software service from being deployed to the user account. This can aid the user in troubleshooting problems arising from improperly set task-permissions or avoid such problems altogether.

As one specific example, a user may wish to hire a vendor to deploy managed software products to a user account, such as a cloud account on Amazon Web Services® (AWS). Examples of the vendor may be Red Hat® or Microsoft®. To do so, the user may access an online portal of the vendor with a catalogue of managed software products. Once logged into the online portal, the user can select a group of managed software products for the vendor to deploy to the user account. The user may also provide the login credentials for the user account to the vendor via the online portal. In some examples, the online portal can be a client facing portion of a system described herein. The system can receive the selection of managed software products from the user and determine which software services are included in each of the managed software products. The system can then generate a list of task permissions based on the software services included in the managed software products. The list of task permissions can indicate which task permissions to set for each individual software service. The system can output the list of task permissions to the user via the online portal, so that the user can set the task permissions for the software services in the user account. In this way, the system can assist the user in properly setting the task permissions to avoid some or all of the problems described above.

The system can determine which task permissions to set for each individual software service of each individual software product using one or more techniques. For example, the system can include a predefined database indicating each software service that is included in each software product. The database can also indicate which task permissions to set for each software service in the context of each software product. The system can access the database to determine which task permissions to set for each software service of each software product. As another example, the system can access documentation associated with a software service or a software product, where the documentation can describe which task permissions to set for the software service. The system can analyze the documentation to determine which task permissions to set for each software service (e.g., in the context of the software product).

Once the system has determined which task permissions to set for each software service of each software product, the system can determine if there is any overlap between the software services of the software products. As noted above, it is possible for two software products to rely on the same software service, but require different task permissions to be set for the software service. The system can identify such situations and consolidate the task permissions associated with the software service into a single unified list. For example, the user may have chosen to deploy Managed Software Product A and Managed Software Product B to the user account. Both of these managed software products may include a particular software service, such as a webserver service. When the particular software service is used in relation to Managed Software Product A, task permissions {1, 2, 3} may be required. When the particular software service is used in relation to Managed Software Product B, task permissions {1, 3, 4} may be required. In some examples, the system can determine that the user has selected two software products that involve the same software service and consolidate the task permissions for the software service together. Consolidating the task permissions may involve merging the task permissions together into a single unified list, such as {1, 2, 3, 4}. Consolidating the task permissions can additionally or alternatively involve excluding task permissions that are superfluous or encompassed by other task permissions. For example, task permission 1 may be an optional task permission that is not required for either software product. So, the system can consolidate the task permissions for the software service to {2, 3, 4}, whereby task permission 1 is excluded from the list. As another example, task permission 3 may be higher in a permission hierarchy than task permission 2 and encompass task permission 2. So, the system can consolidate the task permissions for the software service to {1, 3, 4}. After generating the consolidated list of task permissions for the software service, the system can incorporate the consolidated list of task permissions into the output list of task permissions that is provided to the user.

In some examples, the system may provide the output list of task permissions to the user and then wait for confirmation from the user that the task permissions have been set prior to deploying the selected software products to the user account. This can prevent the software products from being deployed before the task permissions are properly configured on the user account.

In some examples, the system can assist in properly setting the task permissions. For example, the system can generate a script configured for automatically setting some or all of the task permissions for the software services in the user's account. The system can generate the script based on the list of task permissions. The script may be generated by filling in one or more predefined templates with the task permissions in the list. In some examples, the user can download the script to a computing device and run (e.g., execute) the script to automatically set the task permissions therein. Alternatively, the system can run the script itself to automatically set the task permissions in the user account. Using a script to set the task permissions can reduce errors and improve speed.

In some examples, the system can validate that the task permissions are properly set for some or all of the software services of the software products, before or after deploying the software products to the user account. For example, the system can transmit requests to an API of the distributed computing environment that is hosting the user account. The requests may be configured to validate if certain permissions are set or functionality is available in the user account. Based on responses from the distributed computing environment to the requests, the system can determine if each task permission for each software service is properly set for each selected software product. If the system determines that a task permission for a software service is improperly set, the system can notify the user of the issue (e.g., by outputting a warning in a graphical user interface or in the online portal of the vendor). In some examples, the system can implement this permission validation by using a policy simulator to perform policy simulation associated with the task permissions. An example of such a policy simulator may be Identity Access Management (IAM) policy simulator, which may be part of AWS. Policy simulation can involve examining and validating the permissions that are set in a user account.

After deploying the software products to the user account, updates to the underlying software services may become available. The updates may necessitate changes to the task permissions in the user account. In some examples, the system can determine that such updates are available and notify the user about the changes to the task permissions, for example prior to the updates being deployed to the user account. This may allow the user to update the task permissions preemptively and avoid any problems from arising due to the change. Notifications can be provided to the user in any suitable manner, such as by e-mail; by text message; through an alert system, such as Prometheus®; or through the online portal, such as an online portal of a vendor managing the software services.

In some cases, the user may wish to add additional software products to the user account or remove software products from the user account, after deploying an initial set of software products to the user account. For example, the user may login to a vendor's online portal and select an additional managed software-product to deploy to the user account or select an existing managed software-product to remove from the user account. The system can determine that the user has chosen to make such modifications, determine how those modifications affect the task permissions in the user account, and notify the user accordingly. For example, the system can determine that the user has chosen to add an additional software product to the user account. The system can determine task permissions to set in relation to the software services of the additional software product. The system can then compare the task permissions for the software service to the task permissions already set in the user account for the software service, to determine if there are any differences between the two. If the system identifies differences between the two, the system can notify the user of the differences and recommend a setting for the task permission. The system may determine the recommendation using the consolidation functionality described above.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for setting task permissions for software services in a distributed computing environment 132 according to some aspects of the present disclosure. The system 100 includes a server 102 in communication with a client device 124 via a network, such as a local area network or the Internet. Examples of the client device 124 can include a desktop computer, a server, or a mobile device (e.g., a laptop computer, tablet, or mobile phone). A user 126 may operate the client device 124 to interact with the server 102. The server 102 may provide a website-based portal or another interface for facilitating interaction with the user 126.

The server 102 can be configured to assist the user 126 in setting task permissions for software products 104*a-n* in the distributed computing environment 132, which may be owned or operated by a service provider that is distinct from the user 126. This process may begin with the user 126 operating the client device 124 to supply input 130 to the server 102 indicating which of the software products 104*a-n* are to be deployed to the distributed computing environment 132. For example, the server 102 may provide a catalogue of any number and combination of software products 104*a-n* that are deployable to the distributed computing environment 132. Some or all of the software products 104*a-n* may be managed software products, and the server 102 may be owned or operated by a vendor of the managed software products. The user 126 can select a subset 104*a-b* of the software products 104*a-n* from the catalogue. While in this example the subset 104*a-b* includes two of the software products 104*a-n*, it will be appreciated that the subset 104*a-b* can include any number and combination of the software products 104*a-n*. Based on the user's selections, the server 102 can determine which software products 104*a-b* are to be deployed to the distributed computing environment 132.

After determining which software products 104*a-b* are to be deployed to the distributed computing environment 132, the server 102 can determine which software services are included in each of the selected software products 104*a-b*. For simplicity, software services are designated "SS" in FIG. 1. Each of the selected software products 104*a-b* can include any number and combination of software services. In the example shown in FIG. 1, software product 104*a* includes software service A, software service B, software service C, and Software Service D. Software product 104*b* includes software service E, software service A, and software service H. Software product 104*n* includes software service F and software service X. In this example both of the selected software products 104*a-b* include software service A, but other examples may have more or fewer software services in common among two or more software products.

One illustrative example of the software product 104*a* can be the OpenShift Dedicated, version 4, by Red Hat®. This software product will be referred to hereafter as OSD-4. OSD-4 can include numerous software services. To properly function, the software services may depend on various computing resources made available in the distributed computing environment 132. Examples of such computing resources can include an elastic cloud compute service, such as Amazon Elastic Compute Cloud 2 (EC2); an autoscaling service, such as Amazon EC2 Auto Scaling; a simple storage service, such as Amazon Simple Storage Service; an identity and access management service; an elastic load balancing service; a direct connect service, such as AWS Direct Connect; a support service, such as AWS Support; a key management service, such as AWS Key Management Service; a security token service, such as AWS Security Token Service; a resource tagging service, such as AWS resource tagging; and a DNS routing service, such as AWS Route53 DNS. One specific example of software product 104B can include Red Hat Managed Integration, version 2, by Red Hat®. This software product will be referred to hereafter RHMI-2. RHMI-2 can include numerous software services. To properly function, the software services may depend on various computing resources made available in the distributed computing environment 132. Examples of such computing resources can include an elastic cloud compute service, such as Amazon EC2; an identity and access management service; an Amazon CloudWatch service; a security token service (STS); an elastic cache service; a relational database service (RDS); and an e-mail service, such as Amazon Simple E-mail Service (SES). In these specific examples, the software services of OSD-4 and RHMI-2 depend on common computing resources, such as the elastic cloud compute service and the identity and access management service.

The server 102 can determine which software services are included in each of the selected software products 104a-b based on documentation 106 associated with the software products 104a-b, information stored in a database 116, or both. For example, a developer of the software product 104a may provide documentation 106 accompanying the software product 104a, where the documentation 106 indicates which software services are included in the software product 104a. The documentation 106 may be stored internally to the server 102 or externally to the server, such as in a repository (e.g., repository 120). The server 102 can obtain the documentation 106 and parse the documentation 106 using one or more parsers, to determine which software services are included in each of the selected software products 104a-b. As another example, the server 102 can access a database 116 that includes predefined relationships between software products 104a-n and the software services included therein. The server 102 may access the database 116 via a network, such as a local area network or the Internet. Based on the predefined relationships in the database 116, the server 102 can determine which software services are included in the selected software products 104a-b. It will be appreciated that although the database 116 is depicted in FIG. 1 as being external to the server 102, in other examples the database 116 can be stored internally to the server 102. The database 116 can be maintained by an operator of the server 102 (e.g., a vendor of managed software products), a developer of the software products 104a-n, or another entity.

Having determined which software services are included in each of the selected software products 104a-b, the server 102 can determine one or more task permissions associated with each software service in each of the selected software products 104a-b. The task permissions may be required permissions or desirable permissions. In some examples, the server 102 can determine the task permissions for a software service by accessing a database 116 that includes predefined relationships 118 between software services and task permissions. One example of such relationships 118 is shown in the dash box of FIG. 1. In this example, software service A has task permissions {1, 2}, software service B has task permissions {5, 6, 7}, software service C has task permissions {1, 8, 10, 12}, and software service D has task permission {9}. As mentioned above, the task permissions for a particular software service may be dependent on the software product in which the software service is included. For example, the same software service (e.g., software service A) may have different task permissions for software product 104a than for software product 104b. The predefined relationships 118 may reflect these differences, in that the predefined relationships 118 may include different sets of task permissions for a particular software service in relation to different software products.

One illustrative example can relate to the software services associated with OSD-4 and RHMI-2, described above. In this example, each of the software services for OSD-4 may require the "all" task permission, which allows the software services to perform all available tasks (e.g., all available "actions" in an AWS cloud environment). The server 102 can access the database 116 to determine that the "all" task permission is to be set for each individual software service associated with OSD-4. On the other hand, RHMI-2 may have software services that do not require such broad task permissions. For example, the server 102 can access the database 116 to determine that the software services for RHMI-2 require certain task permissions, so that the software services can execute the following actions in relation to the corresponding computing resources shown in Table 1 below:

TABLE 1

Computing Resources and Corresponding Actions

| Computing Resource | Actions |
|---|---|
| EC2 service | DescribeVpcs, DescribeSubnets, DescribeSecurityGroups |
| Identity and Access Management | CreateServiceLinkedRole |
| Amazon CloudWatch | ListMetrics, GetMetricData |
| STS | GetCallerIdentity |
| Elastic Cache | CreateReplicationGroup, DeleteReplicationGroup, DescribeReplicationGroups, DescribeServiceUpdates, AddTagsToResource, DescribeSnapshots |
| RDS | DescribeDBInstances, CreateDBInstance, DeleteDBInstance, ModifyDBInstance, AddTagsToResource, DescribeDBSnapshots, CreateDBSnapshot, DeleteDBSnapshot |
| Amazon SES | SendRawEmail |

Each of these actions can be executed by a corresponding software service in the distributed computing environment 132, if the proper task permissions are set for the software service. For example, a software service can execute the "CreateDBInstance" action to interact with RDS to create a new database instance. As another example, a software service can execute the "CreateReplicationGroup" action to interact with the elastic cache to create a new replication group for replicating cached data. Accordingly, the task permissions associated with the software services of RHMI-2 may be more targeted and specific than the task permissions for OSD-4.

After determining the task permissions corresponding to each software service in relation to each of the selected software products 104a-b, the server 102 can consolidate the task permissions based on predefined rules 114. The predefined rules 114 may dictate how the task permissions are to be consolidated. Consolidating the task permissions may involve merging the task permissions together into a single unified list. For example, software product 104a and software product 104b both include software service A. In the context of software product 104a, software service A may require the task permissions {1, 2}. In the context of software product 104b, software service A may require the task permissions {1, 4, 3, 5}. The server 102 can consolidate these sets of task permissions into a single unified set of task permissions for software service A: {1, 2, 3, 4, 5}. This unified set can exclude duplicate task permissions, for example duplicates of task permission {1}. Consolidating the task permissions can additionally or alternatively involve excluding task permissions that are superfluous or encompassed by other task permissions. For example, task permission 3 may be higher in a permission hierarchy than task permission 2 and encompass task permission 2. So, the system can consolidate the task permissions for software service A to {1, 3, 4, 5}. After generating the consolidated list of task permissions for the software service, the server 102 can incorporate the consolidated list of task permissions into a list of task permissions 108.

One illustrative example can relate to the software services associated with OSD-4 and RHMI-2, described above. In this example, OSD-4 may require the a software service to have the "all" task permission in relation to interactions with the computing resource EC2, and RHMI-2 may require the software service to have the task permissions {X, Y, Z} in relation to interactions with the computing resource EC2. Since the "all" task permission is higher in a permission hierarchy than these individual task permissions and encompasses these individual task permissions, the server 102 can generate a consolidated list of task permissions that is just {all}.

The server 102 can repeat the above process for each individual software service of the selected software products 104a-n to determine a consolidated list of task permissions for the software service. The end result can be a list of task permissions 108 that describes the task permissions to set for each individual software service of the selected software products 104a-b.

In some examples, the server 102 can transmit the list of task permissions 108 as an output, such as output 128, to the user 126. This may allow the user 126 to configure the distributed computing environment 132 based on the list of task permissions 108 and thereby enable the software services to execute the tasks in the distributed computing environment 132. For example, the user 126 may have a user account 136 in the distributed computing environment 132. Based on the list of task permissions 108 generated by the server 102, the user 126 may login to the user account 136 and configure the user account 136 with the task permissions set forth in the list of task permissions 108, so that the software services are capable of properly executing once deployed to the user's account 136.

In some examples, the server 102 may be provided with the login credentials for the distributed computing environment 132 (e.g., for the user account 136). For example, the user 126 can input the login credentials. The server 102 can then use the login credentials to access the distributed computing environment 132 and automatically configure the distributed computing environment 132 based on the list of task permission 108. Automatically configuring the distributed computing environment 132 based on the list of task permissions 108 may involve transmitting requests 140 to an interface (e.g., an API 134) of the distributed computing environment 132 for setting the task permissions associated with the software services. By automatically setting the task permissions, errors may be avoided and the burden on the user 126 may be reduced.

In some examples, the server 102 can generate a script 110 to assist the user 126 in configuring the distributed computing environment 132 (e.g., the user account 136) based on the list of task permissions 108. For example, the server 102 can access a repository 120 having any number and combination of predefined templates 122. The server 102 may access the repository 120 via a network, such as a local area network or the Internet. Each template can include program code that is runnable for setting one or more task permissions for a software service. The predefined templates 122 may be created by developers associated with the server 102, the software services, the software products, or the distributed computing environment 132. The server 102 can obtain the appropriate templates corresponding to the software services of the selected software products 104a-b and modify the templates based on the list of task permissions 108 in order to generate the script 110. For example, the server 102 can fill in fields or variable values in the templates based on the list of task permissions 108 to generate the script 110. The script 110 may then be run to automatically set the appropriate task permissions for the software services. For example, the script 110 can be configured to transmit requests 140 to an interface (e.g., API 134) of the distributed computing environment 132 for setting the task permissions associated with the software services. The script 110 may be run on any suitable system component, such as on the client device 124, on the server 102, or in the distributed computing environment 132.

In some examples, the server 102 can validate that the task permissions are properly set for some or all of the software services of the selected software products 104a-b, before or after deploying the software products 104a-b to the distributed computing environment 132. For example, the server 102 can transmit requests 140 to an API 134 of the distributed computing environment 132. The requests 140 may be configured to validate if certain permissions are set or functionality is available in the distributed computing environment 132, such as in the user account 136. Based on responses from the distributed computing environment 132 to the requests, the server 102 can determine if each task permission for each software service is properly set for each of the selected software products 104a-b. If the server 102 determines that a task permission for a software service is improperly set, the server 102 can generate an output such as output 128 to notify the user 126 of the issue. The server 102 may also prevent the corresponding software service or software product from being deployed to the distributed computing environment 132. In some examples, the server 102 can implement this permission validation by using a policy simulator to perform policy simulation associated with the task permissions. An example of such a policy simulator may be Identity Access Management (IAM) policy simulator, which may be part of AWS.

Eventually, the selected software products 104a-b may be deployed to the distributed computing environment 132. For example, the server 102 can deploy the selected software products 104a-b to the distributed computing environment 132 after validating that the appropriate task permissions are set. Thereafter, updates to the underlying software services may become available. The updates may necessitate changes to the task permissions. In some examples, the server 102 can determine that such updates are available and generate an output such as output 128 to notify the user 126 about the changes to the task permissions. The user 126 may be notified of the changes prior to the updates being deployed to the distributed computing environment 132, for example prior to the server 102 deploying the updates to the distributed computing environment 132. This may provide the user 126 with the opportunity to preemptively update the task permissions and thereby avoid any problems from arising due to the change. Any of the notifications described herein can be provided to the user 126 using any suitable approach, such as by e-mail; by text message; through an alert system, such as Prometheus®; or through the online portal, such as an online portal of a vendor managing the software services.

In some cases, the user 126 may wish to add additional software products to the distributed computing environment 132 or remove software products from the distributed computing environment 132, after deploying an initial set of software products to the distributed computing environment 132. For example, the user 126 may select an additional software product to be deployed by the server 102 to the user account 136 or select an existing software product to be removed from the user account 136. The server 102 can determine that the user has chosen to make such modifications, determine how those modifications affect the task permissions in the distributed computing environment 132, and generate an output such as output 128 to notify the user 126 accordingly.

For example, the server 102 can determine that the user 126 has chosen to remove software product 104*a* from the user account 136. As noted above, software product 104*a* and software product 104*b* both include software service A, but may have different task permission requirements for software service A. In particular, software product 104*a* may require a broader set of task permissions for software service A than software product 104*b*. By removing software product 104*a*, such broad task permissions may no longer be necessary. So, the server 102 can determine that a more-limited set of task permissions associated with software product 104*b* can be used after the software product 104*a* is removed from the user account 136. The server 102 may then generate an output such as output 128 to notify the user 126 of the more-limited set of task permissions, or may automatically configure the distributed computing environment 132 to use the more-limited set of task permissions in relation to software service A. Using the above techniques, the server 102 can help manage the task permissions of the software services as changes or updates are made to the software products deployed to the distributed computing environment 132.

Although FIG. 1 shows a particular number and combination of components, this is intended to be illustrative and non-limiting. Other examples may include more components, fewer components, different components, or a different combination of the components described above. In one such alternative example, the server 102 may be part of the distributed computing environment 132. As another example, at least some of the functionality attributed to the server 102 in the above discussion may be performed by the client device 124, for example by software executing on the client device 124. It will further be appreciated that each element shown in FIG. 1 can represent one or more of that element. For example, the server 102 can represent any number and combination of servers, the client device 124 can represent any number and combination of client devices, the database 116 can represent any number and combination of databases, the repository 120 can represent any number and combination of repositories, etc.

Figure 2:
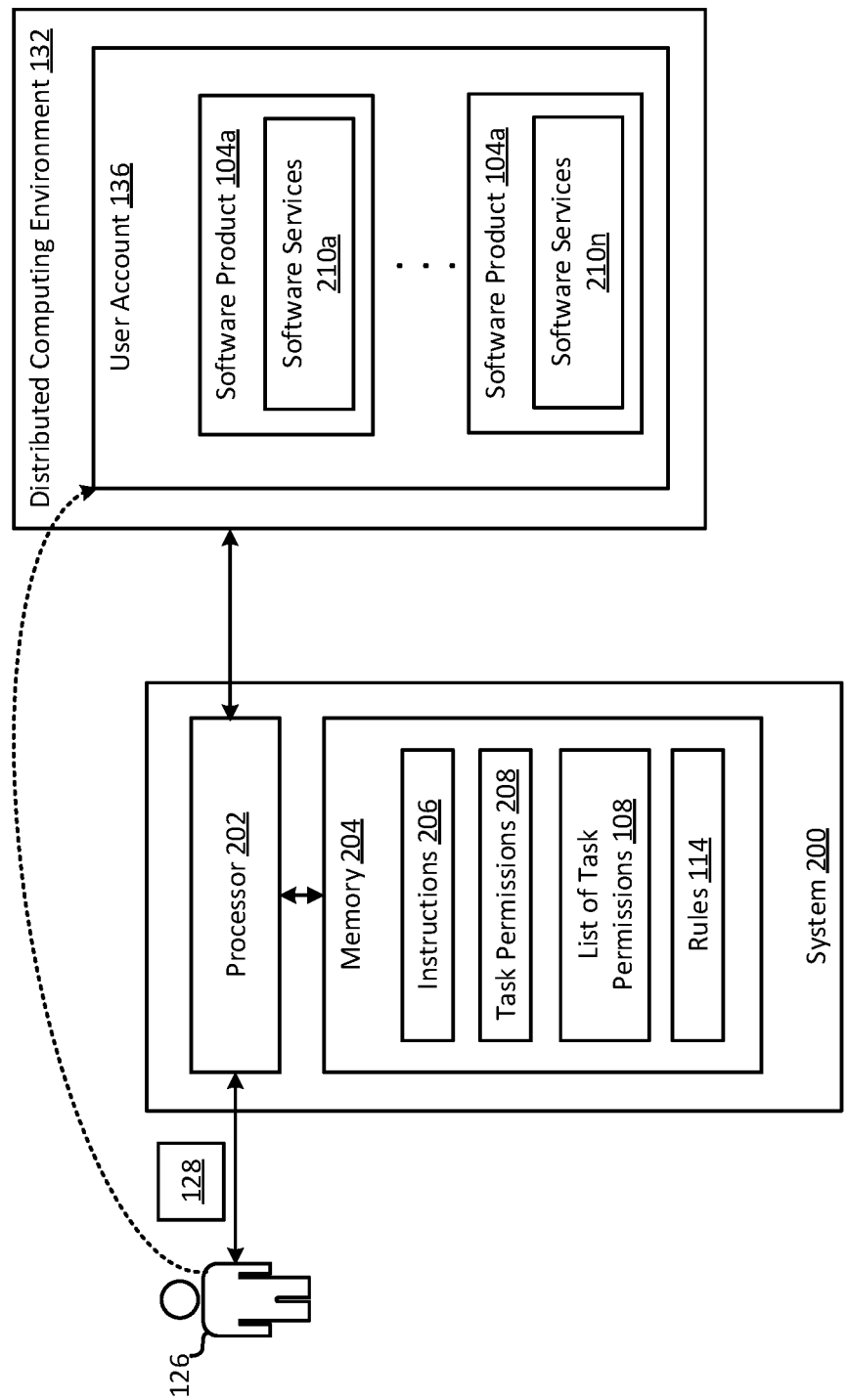
FIG. 2 is a block diagram of another example of a system for setting task permissions for software services in a distributed computing environment according to some aspects of the present disclosure.

FIG. 2 is a block diagram of another example of a system 200 for setting task permissions for software services in a distributed computing environment 132 according to some aspects of the present disclosure. The system 200 includes a processor 202 communicatively coupled to a memory 204. In some examples, the processor 202 and the memory 204 can be part of the same computing device, such as the server 102 of FIG. 1. In other examples, the processor 202 and the memory 204 can be distributed from (e.g., remote to) one another.

The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. In some examples, the instructions 206 can include processor-specific instructions generated by a compiler or an interpreter from code written in any suitable computer-programming language, such as C, C++, C#, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory 204 can include a non-transitory computer-readable medium from which the processor 202 can read instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

In some examples, the processor 202 can execute the instructions 206 to perform some or all of the functionality described herein. For example, the processor 202 can determine software services 210*a*-*n* that are included in software products 104*a*-*n* deployable to a user account 136 of a distributed computing environment 132. The processor 202 can also determine task permissions 208 to be set in the user account 136 for allowing the software services 210*a*-*n* to execute tasks in the distributed computing environment 132. The processor 202 can then generate a list of task permissions 108 by consolidating the task permissions 208 based on predefined rules 114. The processor 202 can transmit an output 128 indicating the list of task permissions 108 for causing the user account 136 to be configured in accordance with the list of task permissions 108, to permit the software services 210*a*-*n* to execute the tasks in the distributed computing environment 132. For example, the processor 202 can transmit the output 128 to the user 126 for allowing the user 126 to configure the user account 136 based on the list of task permissions 108.

Figure 3:
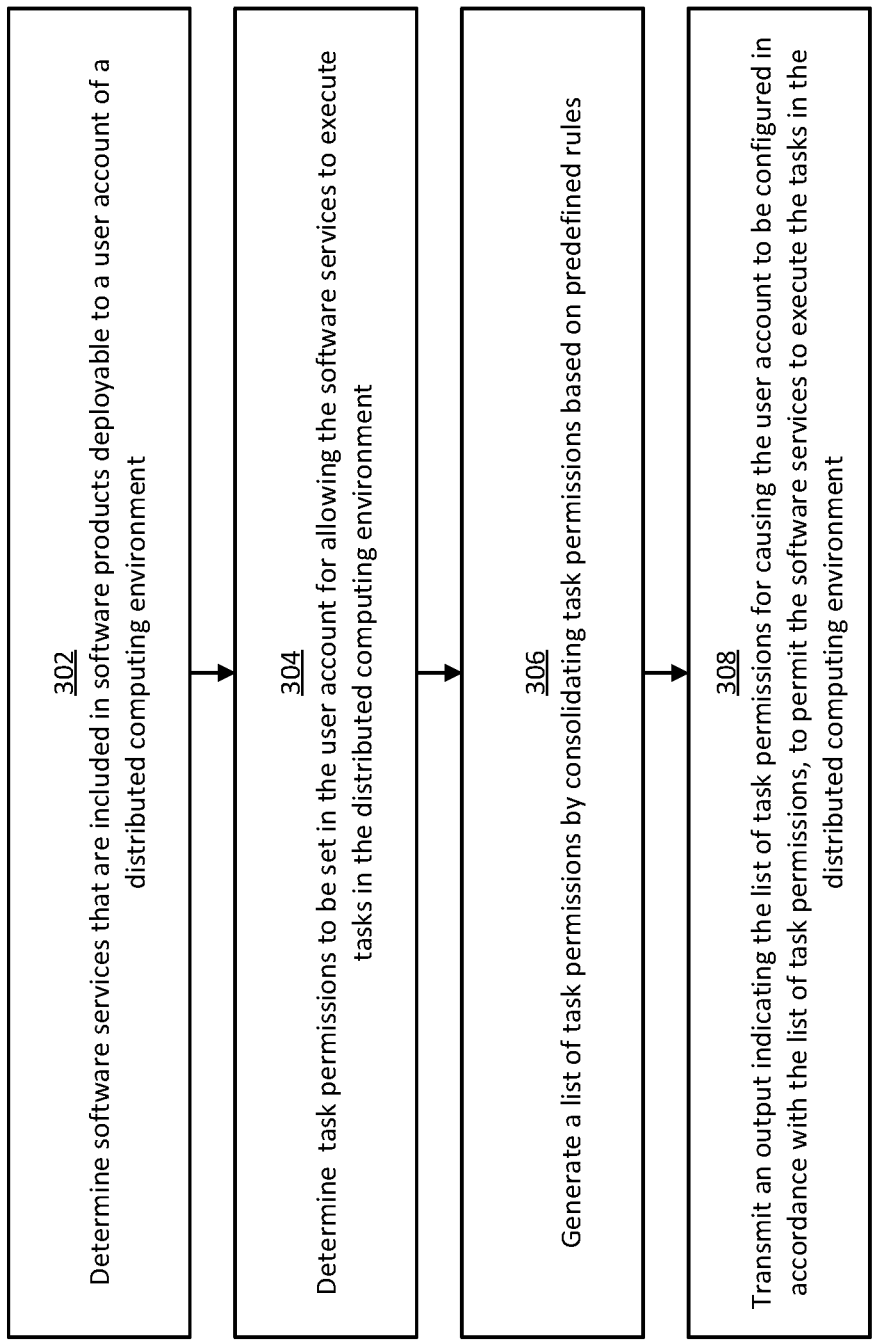
FIG. 3 is a flow chart of an example of a process for setting task permissions for software services in a distributed computing environment according to some aspects of the present disclosure.

In some examples, the processor 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, the processor 202 determines software services 210*a*-*n* that are included in software products 104*a*-*n* deployable to a user account 136 of a distributed computing environment 132. In some examples, the processor 202 can determine the software services 210*a*-*n* based on documentation associated with the software services 210*a*-*n*. In other examples, the processor 202 can determine the software services 210*a*-*n* based on relationships in a database associated with the software services 210*a*-*n*.

In block 304, the processor 202 determines task permissions 208 to be set in the user account 136 for allowing the software services 210*a*-*n* to execute tasks in the distributed computing environment 132. In some examples, the processor 202 can determine the task permissions 208 based on relationships stored in a database, where the relationships indicate which task permissions to assign to each software service (e.g., in the context of a particular software product).

In block 306, the processor 202 generates a list of task permissions 108 by consolidating the task permissions 208 based on predefined rules 114. For example, the processor 202 can merge the task permissions and de-duplicate task permissions, if needed. The processor 202 can also replace task permissions or remove extraneous task permissions, based on the predefined rules 114. An exemplary process for generating the list of task permissions 108 is described in greater detail later on with reference to FIG. 4.

In block 308, the processor 202 transmits an output 128 indicating the list of task permissions 108 for causing the user account 136 to be configured in accordance with the list of task permissions 108, which can permit the software services 210*a*-*n* to execute the tasks in the distributed computing environment 132. For example, the processor 202 can transmit the output 128 to a user 126 so that the user 126 can configure the user account 136 based on the list of task permissions 108. As another example, the processor 202 can transmit the output to a hardware or software component (e.g., a piece of software or a remote computer), so that the component can automatically configure the user account 136 based on the list of task permissions 108.

Figure 4:
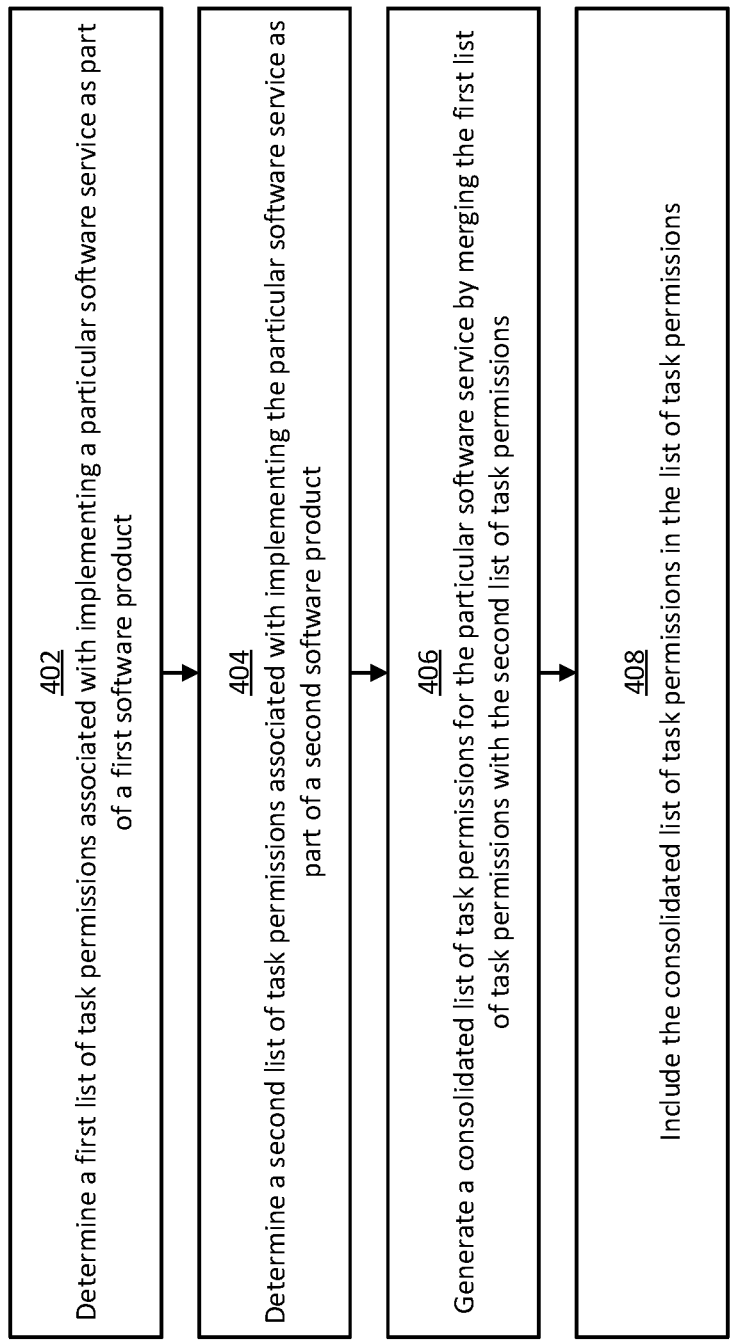
FIG. 4 is a flow chart of an example of a process for determining a list of task permissions according to some aspects of the present disclosure.

FIG. 4 is a flow chart of an example of a process for determining a list of task permissions according to some aspects of the present disclosure. The steps of FIG. 4 are discussed below with reference to the components discussed above in relation to FIG. 2.

In block 402, the processor 202 determines a first list of task permissions associated with implementing a particular software service as part of a first software product 104a. An example the particular software service may be software service A of FIG. 1. In some examples, the processor 202 can determine the first list of task permissions based on relationships between software services and task permissions stored in a database.

In block 404, the processor 202 determines a second list of task permissions associated with implementing the particular software service as part of a second software product 104b. In some examples, the processor 202 can determine the second list of task permissions based on relationships between software services and task permissions stored in a database.

In block 406, the processor 202 generates a consolidates list of task permissions for the particular software service by merging the first list of task permissions with the second list of task permissions. For example, software product 104a and software product 104b both include software service A. In the context of software product 104a, software service A may require the first set of task permissions {1, 2}. And in the context of software product 104b, software service A may require the second set of task permissions {1, 4, 3, 5}. The processor 202 can merge these sets of task permissions into a single, consolidated list of task permissions such as {1, 2, 3, 4, 5}. While this example includes two sets of task permissions for software service A, it will be appreciated that similar principles can be applied for any number of sets of task permissions for software service A.

In block 408, the processor 202 includes the consolidated list of task permissions in the list of task permissions 108.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A system comprising:
a processor; and
a memory including instructions that are executable by the processor for causing the processor to:
determine software services that are included in software products deployable to a user account of a distributed computing environment, wherein the software services are executable software programs that support the software products;
determine task permissions to be set in the user account for allowing the software services to execute tasks in the distributed computing environment, wherein the task permissions include a first set of task permissions associated with implementing a particular software service as part of a first software product among the software products, and wherein the task permissions include a second set of task permissions associated with implementing the particular software service as part of a second software product among the software products;
generate a list of task permissions by consolidating the task permissions based on predefined rules, wherein generating the list of task permissions involves:
generating a consolidated set of task permissions for the particular software service by merging the first set of task permissions with the second set of task permissions;
incorporating the consolidated set of task permissions into the list of task permissions; and
transmit an output indicating the list of task permissions for causing the user account to be configured in accordance with the list of task permissions, to permit the software services to execute the tasks in the distributed computing environment.

2. The system of claim 1, wherein the memory further includes instructions that are executable by the processor for causing the processor to:
receive a selection of the software products from a user;
based on receiving the selection from the user, determine the software services that are included in the software products; and
based on determining the software services that are included in the software products, determine the task permissions by using a database or documentation associated with the software services.

3. The system of claim 1, wherein the memory further includes instructions that are executable by the processor for causing the processor to generate the consolidated set of task permissions by:
determining that the second set of task permissions includes a duplicate task permission that is also present in the first set of task permissions; and
generating the consolidated set of task permissions to exclude the duplicate task permission.

4. The system of claim 1, wherein the memory further includes instructions that are executable by the processor for causing the processor to generate the consolidated set of task permissions by:
determining that the first set of task permissions includes a first task permission;
determining that the second set of task permissions includes a second task permission that is higher in a permission hierarchy than the first task permission and overrides the first task permission; and
generating the consolidated set of task permissions to include the second task permission and exclude the first task permission.

5. The system of claim 1, wherein the memory further includes instructions that are executable by the processor for causing the processor to, subsequent to transmitting the output:
determine whether a particular task permission in the list of task permissions is set in the user account for a particular software service of the software services; and
in response to determining that the particular task permission is not set for the particular software service in the user account:

output a notification indicating that the particular task permission is not set for the particular software service in the user account; and prevent the particular software service from being deployed to the user account.

6. The system of claim 1, wherein the memory further includes instructions that are executable by the processor for causing the processor to:

deploy the software services to the user account; and subsequent to deploying the software services to the user account:

determine that an update is available for a particular software service of the software services;

based on the update, determine a change to a task permission associated with the particular software service; and output a notification indicating the change to the task permission prior to the update being deployed to the user account, for causing the task permission to be adjusted in the user account.

7. The system of claim 1, wherein the memory further includes instructions that are executable by the processor for causing the processor to:

generate a script based on the list of task permissions, the script being executable for causing requests to be transmitted to an application programming interface (API) of the distributed computing environment for automatically configuring the user account in accordance with the list of task permissions.

8. The system of claim 1, wherein the software products include managed software products configured to be managed on the user account by a vendor.

9. The system of claim 1, wherein each of the software products includes a respective set of software services, wherein each of the software services is configured to execute one or more of the tasks, and wherein each of the task permissions is for enabling or disabling execution of one or more of the tasks.

10. A method comprising:

determining, by a processor, software services that are included in software products deployable to a user account of a distributed computing environment, wherein the software services are executable software programs that support the software products;

determining, by the processor, task permissions to be set in the user account for allowing the software services to execute tasks in the distributed computing environment, wherein the task permissions include a first set of task permissions associated with implementing a particular software service as part of a first software product among the software products, and wherein the task permissions include a second set of task permissions associated with implementing the particular software service as part of a second software product among the software products;

generating, by the processor, a list of task permissions by consolidating the task permissions based on predefined rules, wherein generating the list of task permissions involves:

generating a consolidated set of task permissions for the particular software service by merging the first set of task permissions with the second set of task permissions;

incorporating the consolidated set of task permissions into the list of task permissions; and transmitting, by the processor, an output indicating the list of task permissions for causing the user account to be configured in accordance with the list of task permissions, to permit the software services to execute the tasks in the distributed computing environment.

11. The method of claim 10, further comprising:

receiving a selection of the software products from a user;

based on receiving the selection from the user, determining the software services that are included in the software products; and based on determining the software services that are included in the software products, determining the task permissions by using a database or documentation associated with the software services.

12. The method of claim 10, further comprising generating the consolidated set of task permissions by:

determining that the second set of task permissions includes a duplicate task permission that is also present in the first set of task permissions; and generating the consolidated set of task permissions to exclude the duplicate task permission.

13. The method of claim 10, further comprising generating the consolidated set of task permissions by:

determining that the first set of task permissions includes a first task permission;

determining that the second set of task permissions includes a second task permission that is higher in a permission hierarchy than the first task permission and overrides the first task permission; and generating the consolidated set of task permissions to include the second task permission and exclude the first task permission.

14. The method of claim 10, further comprising, subsequent to transmitting the output:

determining whether a particular task permission in the list of task permissions is set in the user account for a particular software service of the software services; and in response to determining that the particular task permission is not set for the particular software service in the user account:

outputting a notification indicating that the particular task permission is not set for the particular software service in the user account.

15. The method of claim 10, further comprising deploying the software services to the user account; and subsequent to deploying the software services to the user account:

determining that an update is available for a particular software service of the software services;

based on the update, determining a change to a task permission associated with the particular software service; and outputting a notification indicating the change to the task permission prior to the update being deployed to the user account, for causing the task permission to be adjusted in the user account.

16. The method of claim 10, further comprising generating a script based on the list of task permissions, the script being executable for causing requests to be transmitted to an application programming interface (API) of the distributed computing environment for automatically configuring the user account in accordance with the list of task permissions.

17. The method of claim 10, wherein the software products include managed software products configured to be managed on the user account by a vendor that is different from a user to which the list of task permissions is output.

18. A non-transitory computer-readable medium comprising program code that is executable by a processor for causing the processor to:
  determine that a particular software service is included in first and second software products deployable to a user account of a distributed computing environment, wherein the particular software service is an executable software program that supports the first and second software products;
  determine first and second task permissions to be set in the user account for allowing the particular software service to execute tasks in the distributed computing environment;
  generate a list of task permissions by consolidating the first and second task permissions for the particular software service based on predefined rules; and
  transmit an output indicating the list of task permissions for causing the user account to be configured in accordance with the list of task permissions, to permit the particular software service to execute the tasks in the distributed computing environment.

19. The non-transitory computer-readable medium of claim 18, further comprising program code that is executable by the processor for causing the processor to:
  determine that the second task permission is a duplicate task permission to the first task permission; and
  generate the list of task permissions to exclude the duplicate task permission.

20. The non-transitory computer-readable medium of claim 18, further comprising program code that is executable by the processor for causing the processor to:
  determine that the second task permission is higher in a permission hierarchy than the first task permission and overrides the first task permission; and
  generate the list of task permissions to include the second task permission and exclude the first task permission.

* * * * *